United States Patent [19]

Takagi

[11] Patent Number: 5,233,700
[45] Date of Patent: Aug. 3, 1993

[54] ADDRESS TRANSLATION DEVICE WITH AN ADDRESS TRANSLATION BUFFER LOADED WITH PRESENCE BITS

[75] Inventor: Hitoshi Takagi, Tokyo, Japan

[73] Assignee: NEC Corporation, Tokyo, Japan

[21] Appl. No.: 605,458

[22] Filed: Oct. 30, 1990

Related U.S. Application Data

[63] Continuation-in-part of Ser. No. 162,903, Mar. 2, 1988, abandoned.

[30] Foreign Application Priority Data

Mar. 3, 1987 [JP] Japan ................................ 62-46739

[51] Int. Cl.⁵ ............................................ G06F 12/00
[52] U.S. Cl. .................................. 395/400; 395/425; 364/DIG. 1; 364/DIG. 2
[58] Field of Search ............................ 395/400, 425

[56] References Cited

U.S. PATENT DOCUMENTS

| | | | |
|---|---|---|---|
| 4,084,225 | 4/1978 | Anderson et al. | 395/400 |
| 4,177,510 | 12/1979 | Appell et al. | 395/400 |
| 4,285,040 | 8/1981 | Carlson et al. | 395/400 |
| 4,520,441 | 5/1985 | Bandoh et al. | 395/425 |
| 4,641,277 | 2/1987 | Yata et al. | 395/400 |
| 4,794,524 | 12/1988 | Carberry et al. | 395/400 X |

OTHER PUBLICATIONS

Patent Abstracts of Japan, vol. 7, No. 15 (P-169), Jan. 21, 1983, [JP-A-57 169 984].
"IBM Enterprise Systems Architecture/370 Principles of Operation", 1989, pp. 3-47, IBM Publication No SA22-7200-0.

Primary Examiner—Joseph L. Dixon
Assistant Examiner—Michael A. Whitfield
Attorney, Agent, or Firm—Foley & Lardner

[57] ABSTRACT

In an address translation device (11) used in combination with a main memory (12) in translating an input virtual address into an output real address, an address translation buffer (15) is for memorizing not only a plurality of buffer virtual addresses (BVA) and a plurality of buffer real addresses (BRA) corresponding to respective buffer virtual addresses but also buffer presence bits (BP) corresponding to respective buffer real addresses to indicate presence or absence of a datum of a memory real address in the main memory in correspondence to each of the buffer real addresses. A comparison control circuit (17) compares the input virtual address with a particular one of the buffer virtual addresses, that corresponds to the input virtual address to make the address translation buffer produce, as the output real address, a particular one of the buffer real addresses, which corresponds to the particular buffer virtual address when the input virtual address coincides with the particular buffer virtual address.

2 Claims, 3 Drawing Sheets

ADDRESS TRANSLATION DEVICE WITH AN ADDRESS TRANSLATION BUFFER LOADED WITH PRESENCE BITS

This is a continuation-in-part application of application Ser. No. 07/162,903, filed Mar. 2, 1988, now abandoned.

BACKGROUND OF THE INVENTION

This invention relates to an address translation device for use in combination with a main memory of an information processing system in translating an input virtual address into an output real address.

In an information processing system, pipeline control is often adopted in order to process a sequence of instructions at a high speed. To this end, a host device, such as an execution processing unit, of the information processing system carries out prefetch or lookahead of instructions from a main memory prior to execution of the prefetched instruction. This shows that the main memory is accessed by the execution processing unit. If the prefetched instruction is either a store instruction or a load instruction, calculation is preliminarily carried out to get an address in the main memory prior to storage or loading. If the prefetched instruction is an operation instruction, one or a plurality of operands are read out of the main memory prior to execution of the operation instruction. If the prefetched instruction is a conditional branch (branch on condition) instruction indicative of a branch on condition, at least one instruction is prefetched on a branch prior to execution of the conditional branch instruction.

A virtual address is produced from the execution processing unit on accessing the main memory and must, therefore, be translated into a corresponding real address of the main memory. In other words, address translation of a virtual address into a real address is indispensable for such an information processing system and may be made by looking up an address translation table stored in the main memory. The address translation table is loaded with a memory presence bit indicative of presence or absence of data for a real address in the main memory in correspondence to the virtual address. It is, however, unavoidable that the address translation is carried out at a low speed. On the other hand, the address translation table must be looked up each time that the address translation is necessary. Therefore, such a table look-up results in an objectionably slow execution rate, despite the pipeline control.

In order to make the execution rate faster, an address translation device is used to carry out address translation of a virtual address into a real address at a high speed. A conventional address translation device comprises an address translation buffer which may be called a translation lookaside buffer (TLB) and which stores or memorizes a predetermined number of entries in relation to virtual addresses already issued from the execution processing unit. More specifically, the address translation buffer is for memorizing a plurality of buffer virtual addresses and a plurality of buffer real addresses corresponding to the respective buffer virtual addresses. The address translation buffer may be loaded with a validity bit representative of either validity or invalidity of each entry. Responsive to a predetermined part of a device input signal which represents the input virtual address, the address translation buffer produces a buffer output signal representative of a particular one of the buffer virtual addresses and a specific validity bit corresponding to the particular buffer virtual address. Although only a part of the device input signal is used, the particular one of the buffer virtual addresses corresponds to the input virtual address. The buffer output signal further represents a particular one of the buffer real addresses that corresponds to the particular buffer virtual address. The conventional address translation device comprises a comparator for comparing the input virtual address with the particular buffer virtual address.

With this structure, the address translation buffer is at first looked up by the input virtual address and quickly carries out address translation of the input virtual address into an output real address as long as the output real address is memorized in correspondence to the input virtual address in question, namely, when the input virtual address coincides with the particular buffer virtual address and, furthermore, when the specific validity bit indicates validity. Stated otherwise, the address translation table of the main memory is accessed only in the absence of any entry corresponding to the input virtual address in question, namely, either when the input virtual address and the particular buffer virtual address do not coincide with each other or when the specific validity bit indicates invalidity. If a specific one of the presence bits that corresponds to the input virtual address indicates an absence, the input virtual address and the corresponding real address are not stored into the address translation buffer.

Under the circumstances, the input virtual address and the corresponding real address are stored in the address translation buffer as the particular buffer virtual address and the particular buffer real address if the specific presence bit indicates only a presence. Simultaneously, the address translation buffer is loaded with the validity bit representative of validity of the particular buffer virtual address. Thereafter, the input virtual address in question is translated into the corresponding output real address by the address translation buffer at a high speed.

The above technique, which is known as a conventional technique, is disclosed in the IBM document SA22.7200-0 "IBM Enterprise Systems Architecture/370 Principles of Operation", pages 3-31 through 3-32.

It will now be assumed that the conditional branch instruction is prefetched as a prefetched instruction in the execution processing unit. Until it is not decided whether or not a branch condition of the conditional branch instruction is realized, the execution processing unit usually carries out prefetch of two instructions from the main memory that are memorized at two real addresses in correspondence to two branch destination virtual addresses indicated by the prefetched conditional branch instruction. After it is decided whether or not the branch condition is realized, the execution processing unit throws away one of the two instructions as a discarded instruction. However, such a prefetch operation can not always be carried out. This is because one or both of the two real addresses in question are not always present in the main memory. In this case, the execution processing unit can not carry out the prefetch operation even by an access to the address translation table in the main memory.

It will now be assumed that the execution processing unit carries out a program including a loop which should be repeated a predetermined number of times. It will furthermore be assumed that the loop comprises a conditional branch instruction and that the discarded instruction is stored in a real address which is absent in the main memory. In this event, the execution processing unit must access the address translation table whenever the prefetch operation is carried out on the conditional branch instruction. The address translation table is accessed a plurality of times which are equal in number to the predetermined number.

Accordingly, the information processing system including the conventional address translation device is disadvantageous in that an address translation operation undesirably wastes time. That is, the conventional address translation device results in degradation of performance of the information processing system.

SUMMARY OF THE INVENTION

It is an object of this invention to provide an address translation device which is capable of effectively carrying out an address translation operation when a prefetch operation is carried out on a conditional branch instruction.

It is another object of this invention to provide an address translation device of the type described, which is capable of avoiding waste of time which might otherwise result from the address translation operation.

An address translation device to which this invention is applicable, is for use in combination with a main memory in translating an input virtual address into an output real address. The address translation device includes an address translation buffer for memorizing a plurality of buffer virtual addresses and a plurality of buffer real addresses corresponding to the respective buffer virtual addresses, and signal producing means coupled to the address translation buffer and responsive to an input signal indicative of the input virtual address for producing a buffer output signal representative of a particular one of the buffer virtual addresses that corresponds to the input virtual address. The buffer output signal further represents a particular one of the buffer real addresses that corresponds to the particular one of the buffer virtual addresses. According to this invention, the address translation buffer comprises a memory area for memorizing buffer presence bits corresponding to the respective buffer real addresses to indicate presence or absence of data for a memory real address in the main memory in correspondence to each of the buffer real addresses. The signal producing means making the buffer output signal indicate not only one of the buffer virtual addresses and one of the buffer real addresses, but also, a specific one of the buffer presence bits that corresponds to the particular one of the buffer real addresses. The address translation device comprises comparing means coupled to the signal producing means and responsive to the input signal and the buffer output signal for comparing the input virtual address with the particular one of the buffer virtual addresses to make the address translation buffer produce a device output signal indicative of the particular one of the buffer real addresses as the output real address when the input virtual address coincides with the particular one of the buffer virtual addresses. An absence of data for the specified real address corresponding to the particular virtual address can be found by referencing the presence bit memorized in the address translation buffer.

DETAILED DESCRIPTION OF THE PREFERRED EMBODIMENTS

Figure 1:
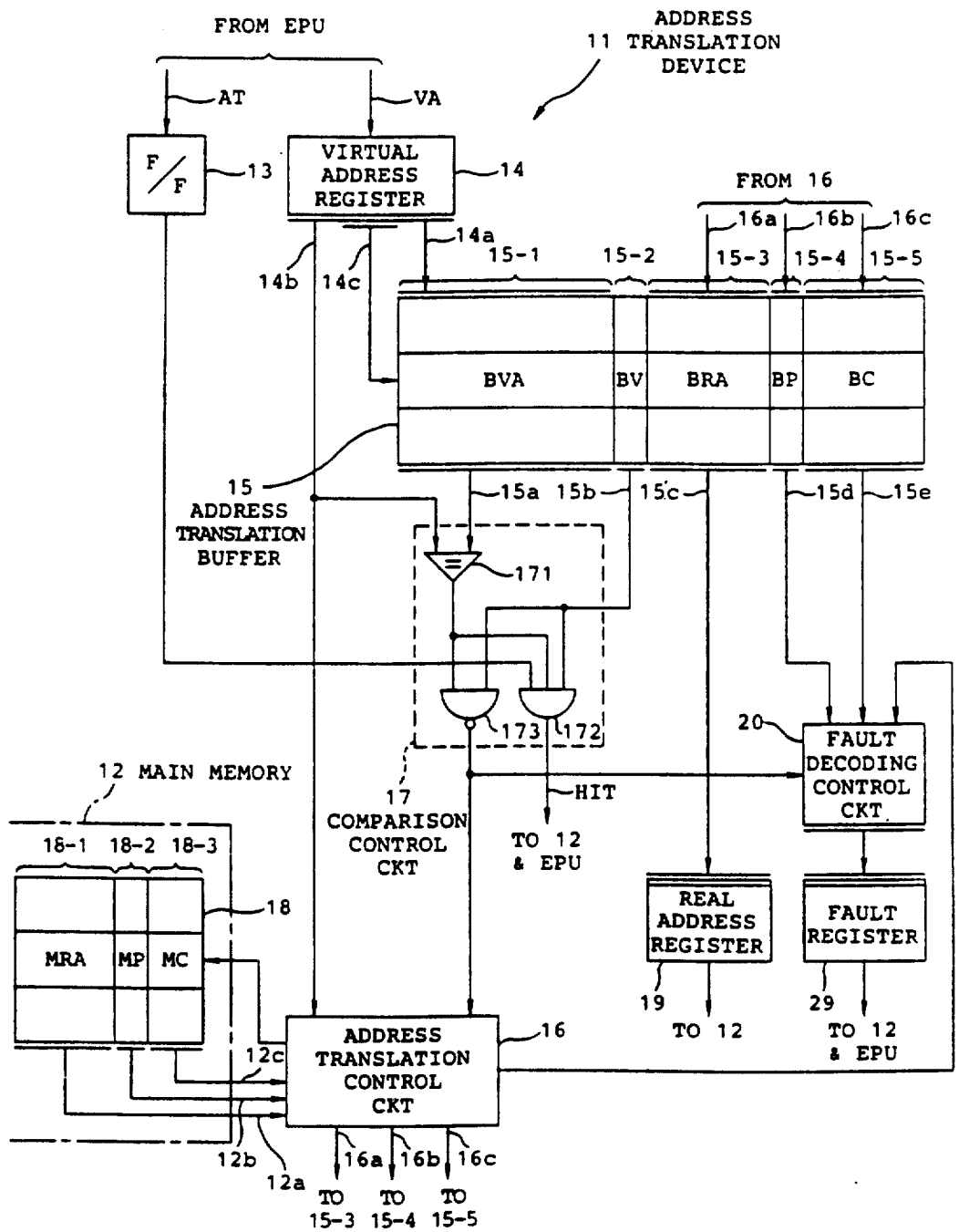
FIG. 1 shows a block diagram of an address translation device according to a preferred embodiment of this invention together with a main memory.

Referring to FIG. 1, an address translation device 11, according to a preferred embodiment of this invention is for use in combination with a main memory 12 of an information processing system in translating an input virtual address into an output real address. The information processing system comprises a host device, such as an execution processing unit (EPU, not shown). The execution processing unit carries out instruction prefetch control of a sequence of instructions which may include a conditional branch (branch on condition) instruction or instructions and other remaining instructions. The remaining instructions will be called regular instructions. Each of the conditional branch and the regular instructions is executed in the execution processing unit in a known manner. As a result of execution, the execution processing unit supplies the address translation device 11 with a device input signal which will be described in the following.

The device input signal includes an input address translation indication signal AT and an input virtual address signal VA. The address translation indication signal AT is representative of an input address translation indication. The virtual address signal VA indicates an input virtual address.

The address translation device 11 is supplied from the execution processing unit with the input address translation indication signal AT and the input virtual address signal VA. The input address translation indication signal AT is stored in an address translation indication flip-flop 13 as a stored address translation indication signal. The stored address translation indication signal takes a logic "1" level when the stored address translation indication signal indicates an address translation indication. Otherwise, the stored address translation indication signal takes a logic "0" level. The input virtual address signal VA is stored in a virtual address register 14 as a stored virtual address signal.

An address translation buffer 15 has a plurality of buffer locations. The stored virtual address signal is sent to the address translation buffer 15 through a first signal line 14a, and to an address translation control circuit 16 and a comparison control circuit 17 through a second signal line 14b. In addition, a part of the stored virtual address signal is sent to the address translation buffer 15 as a buffer access signal through a third signal line 14c. The buffer access signal is used in accessing one of the buffer locations that is thereby indicated. The stored address translation indication signal is sent to the comparison control circuit 17.

The main memory 12 comprises an address translation table 18 coupled to the address translation control circuit 16. The address translation table 18 comprises a real address memory area 18-1, a presence bit memory area 18-2, and a control information memory area 18-3. The real address memory area 18-1 memorizes a plurality of memory real address signals, each of which indicates a memory real address MRA in the main memory 12. The presence bit memory area 18-2 is loaded with a plurality of memory presence bit signals, each of which represents a memory presence bit MP. The memory presence bit MP indicates presence or absence of data for the memory real address MRA in the main memory 12 in correspondence to a memory translation table address which will later be described. The control information memory area 18-3 memorizes a plurality of memory control information signals, each of which represents a memory control information unit MC corresponding to the memory real address MRA.

The address translation buffer 15 comprises a virtual address buffer area 15-1, a validity bit buffer area 15-2, a real address buffer area 15-3, a presence bit buffer area 15-4, and a control information buffer area 15-5. The virtual address buffer area 15-1 memorizes a plurality of buffer virtual address signals each of which indicates a buffer virtual address BVA. The validity bit buffer area 15-2 is loaded with a plurality of buffer validity bit signals, each of which represents a buffer validity bit BV. The buffer validity bit BV indicates either validity or invalidity of the buffer virtual address BVA. The buffer validity bit BV takes the logic "1" level when the buffer validity bit BV indicates validity while the buffer validity bit BV takes the logic "0" level when the buffer validity bit BV indicates invalidity. The real address buffer area 15-3 memorizes a plurality of buffer real address signals, each of which indicates a buffer real address BRA corresponding to the buffer virtual address BVA. The presence bit buffer area 15-4 is loaded with a plurality of buffer presence bit signals, each of which represents a buffer presence bit BP. The buffer presence bit BP indicates presence or absence of data for the memory real address MRA in the main memory 12 in correspondence to the buffer real address BRA. The buffer presence bit BP takes the logic "1" level when the buffer presence bit BP indicates a presence while the buffer presence bit BP takes the logic "0" level when the buffer presence bit BP indicates an absence. The control information buffer area 15-5 memorizes a plurality of buffer control information signals, each of which represents a buffer control information unit BC corresponding to the buffer real address BRA.

It is noted that the real address buffer area 15-3, the presence bit buffer area 15-4, and the control information buffer area 15-5 partially memorize the memory real address signals, the memory presence bit signals, and the memory control information signals as the buffer real address signals, the buffer presence bit signals, and the buffer control information signals, respectively, in a manner to be described later.

During a buffer address translation operation, the address translation buffer 15 produces a buffer output signal in response to the buffer access signal supplied through the third signal line 14c. The buffer output signal comprises first through fifth partial buffer output signals. The first partial buffer output signal represents a particular one of the buffer virtual addresses BVA that corresponds to the stored virtual address. The second partial buffer output signal represents a specific one of the buffer validity bits BV that corresponds to the particular buffer virtual address BVA. The third partial buffer output signal represents a particular one of the buffer real addresses BRA that corresponds to the particular buffer virtual address BVA. The fourth partial buffer output signal represents a specific one of the buffer presence bits BP that corresponds to the particular buffer real address BRA. The fifth partial buffer output signal represents a particular one of the buffer control information units BC that corresponds to the particular buffer real address BRA.

The first and the second partial buffer output signals are sent to the comparison control circuit 17 through first and second buffer output signal lines 15a and 15b, respectively. The third partial buffer output signal is sent to a real address register 19 through a third buffer output signal line 15c. Furthermore, the fourth partial buffer output signal is sent to a fault decoding control circuit 20 through a fourth buffer output signal line 15d. The fifth partial buffer output signal is sent to the fault decoding control circuit 20 through a fifth buffer output signal line 15e.

The comparison control circuit 17 comprises a comparator 171 supplied with the stored virtual address signal through the second signal line 14b and the first partial buffer output signal through the first buffer output signal line 15a. Responsive to the stored virtual address signal and the first partial buffer output signal, the comparator 171 compares the stored virtual address with the particular buffer virtual address BVA and produces a comparison result signal representative of a result of comparison. The comparison result signal takes the logic "1" level when the stored virtual address coincides with the particular buffer virtual address BVA. Otherwise, the comparison result signal takes the logic "0" level. An AND gate 172 is supplied with the comparison result signal, the stored address translation indication signal, and the second partial buffer output signal. The AND gate 172 produces a hit signal HIT of the logic "1" level as follows: (1) when the comparison result signal takes the logic "1" level; (2) when the stored address translation indication signal represents the address translation indication; and furthermore, (30 when the specific buffer validity bit BV indicates validity. The hit signal HIT of the logic "1" level represents that the address translation buffer 15 already memorizes the real address corresponding to the input virtual address. Accordingly, the input virtual address is translated into the corresponding real address by the address translation buffer 15 at a high speed. The hit signal HIT is sent to the main memory 12 and the execution processing unit. Simultaneously, the third partial buffer output signal is stored in the real address register 19 as a stored real address signal. The stored real address signal is sent to the main memory 12 as a device output signal. The device output signal indicates the particular buffer real address as the output real address.

At any rate, the comparison control circuit 17 produces the hit signal HIT of the logic "1" level as follows: (1) when the stored virtual address coincides with the particular buffer virtual address BVA and moreover (2) when the specific buffer validity bit BV indicates validity.

A NAND gate 173 is supplied with the comparison result signal from comparator 71 and the second partial buffer output signal through the second buffer output signal line 15b. The NAND gate 173 produces an output signal of the logic "0" level when the comparison result signal takes the logic "1" level and furthermore when the specific buffer validity bit BV indicates validity. Otherwise, the NAND gate 173 produces an output signal of the logic "1" level. The output signal of the NAND gate 173 is sent to the address translation control circuit 16 and to the fault decoding control circuit 20.

The address translation control circuit 16 is started when the output signal of the NAND gate 173 takes the logic "1" level, namely, either when the stored virtual address and the particular buffer virtual address do not coincide with each other or when the specific buffer validity bit BV indicates invalidity.

Figure 2:
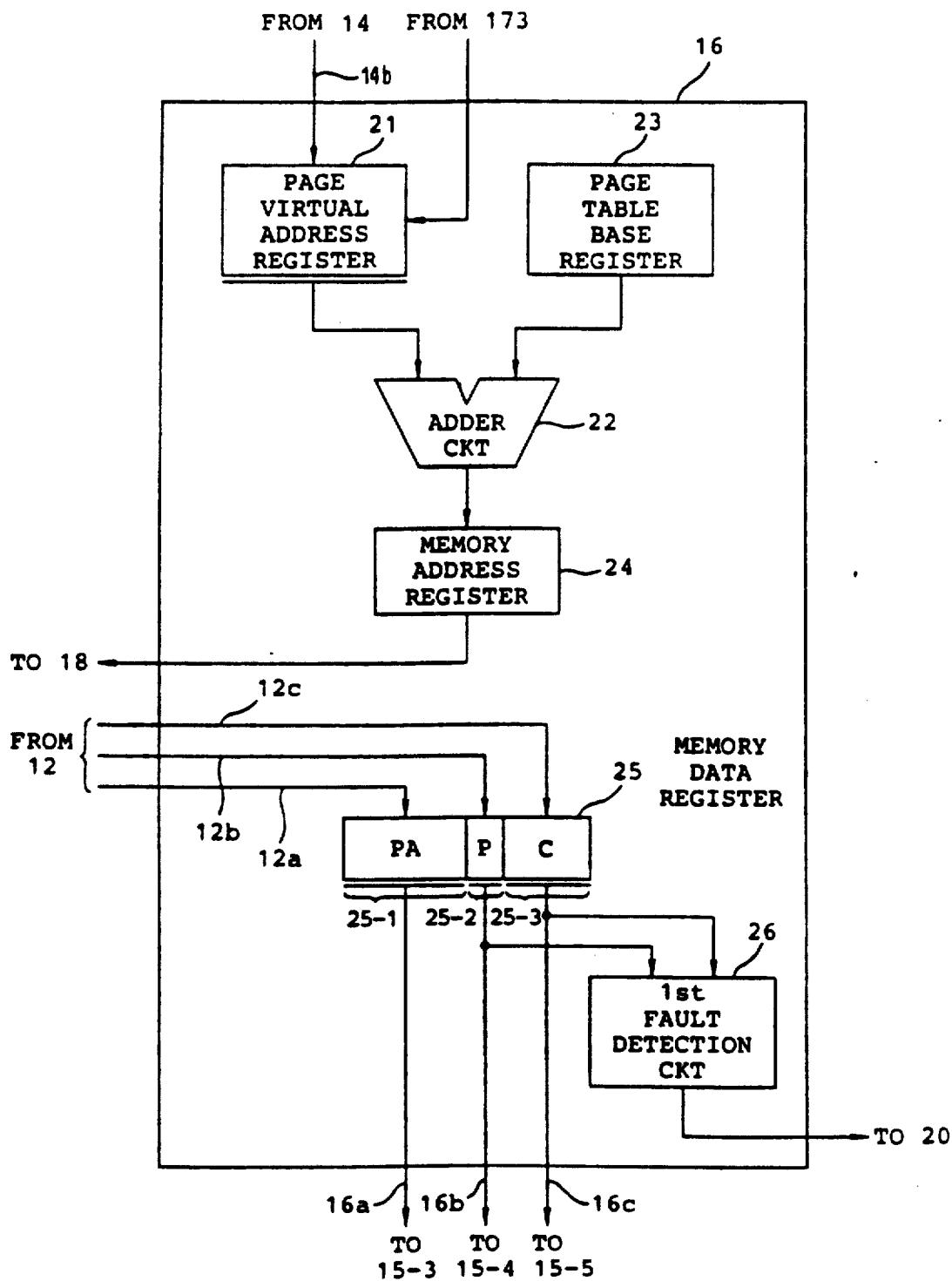
FIG. 2 is a block diagram of an address translation control circuit used in the address translation device.

Referring to FIG. 2 together with FIG. 1, the address translation control circuit 16 is put into an active state in response to the logic "1" level output signal of the NAND gate 173. Specifically, the address translation control circuit 16 is energized to look up the address translation table 18 stored in the main memory 12 and to receive a reply signal sent from the main memory 12.

To this end, the address translation control circuit 16 comprises a page virtual address register 21 for storing the stored virtual address signal sent from the virtual address register 14 through the second signal line 14b. The stored virtual address signal is kept in the page virtual address register 21 when the output signal of the NAND gate 173 takes the logic "1" level.

The stored virtual address signal is sent as a held page virtual address signal from the page virtual address register 21 to an adder circuit 22 connected to a page table base register 23 which keeps a page table base signal specifying a table base address of the address translation table 18 of the main memory 12. The table base address is given in the form of a real address.

The adder circuit 22 adds the held page virtual address signal to the page table base signal to produce a sum signal representative of a sum of the table base address and a page virtual address specified by the held page virtual address signal. From this fact, it is seen that the above-mentioned sum specifies a page table address which corresponds to the stored virtual address signal kept in the virtual address register 14.

The sum signal is sent from the adder circuit 22 a memory address register 24 and is held in the memory address register 24 as an address translation table signal indicative of the address translation table address. The address translation table address signal is sent to the address translation table 18 of the main memory 12 as a memory access signal indicative of a table location to be accessed.

During a memory address translation operation, address translation table 18 produces a memory signal as the reply signal in response to the memory access signal. The memory output signal comprises first through third partial memory output signals. The first through the third partial memory output signals are sent to the address translation control circuit 16 through first through third memory output signal lines 12a, 12b, and 12c.

The first partial memory output signal represents a particular one of the memory real addresses MRA that corresponds to the address translation table address. The second partial memory output signal represents a specific one of the memory presence bits MP that corresponds to the particular memory real address MRA while the third partial memory output signal represents a particular one of the memory information units MC that corresponds to the particular memory real address MRA.

The address translation control circuit 16 comprises a memory data register 25 for storing the memory output signal. The memory data register 25 has first through third partial areas 25-1, 25-2, and 25-3 which are loaded with the first through the third partial memory output signals, respectively, collectively as a stored memory data signal.

The second and the third partial memory output signals of the stored memory data signal are sent from the memory data register 25 to a first fault detection circuit 26. The first fault detection circuit 26 detects whether or not memory address translation is normally carried out by the main memory 12 to produce a fault detection signal when the memory address translation is abnormally carried out. The first fault detection signal is sent from the first fault detection circuit 26 to the fault decoding control circuit 20.

It will be assumed that the memory address translation by the main memory 12 is normally carried out. In this event, the first through the third partial memory output signals of the stored memory data signal are stored in the real address buffer area 15-3, the presence bit buffer area 15-4, and the control information buffer area 15-5 of the address translation buffer 15 through first through third data output lines 16a, 16b, and 16c, respectively. Furthermore, the stored virtual address signal is stored in the virtual address buffer area 15-1 through the first signal line 14a during a buffer storing operation. The first through the third partial memory output signals represent the particular buffer real address BRA, the specific buffer presence bit BP, and the particular buffer control information unit BC, respectively. The stored virtual address signal represents the particular buffer virtual address BVA. Simultaneously, the validity bit buffer area 5-2 of the address translation buffer 15 is loaded with the specific buffer validity bit BV representative of the validity of the particular buffer virtual address BVA.

At any rate, the above-mentioned signals are stored in the address translation buffer 15 in response to the buffer access signal sent from the virtual address register 14 through the third signal line 14c during the buffer storing operation.

Figure 3:
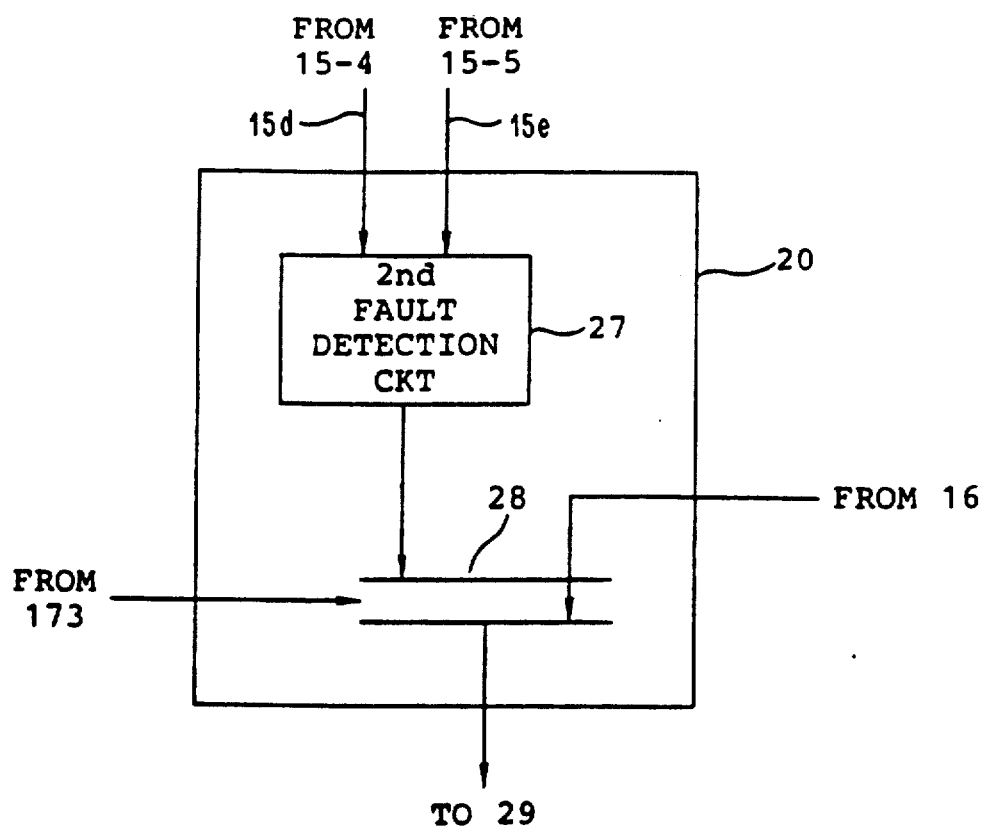
FIG. 3 is a block diagram of a fault decoding control circuit used in the address translation.device.

Referring to FIG. 3 in addition to FIG. 1, the fault decoding control circuit 20 comprises a second fault detection circuit 27 which is supplied with the fourth partial buffer output signal and the fifth partial buffer output signal from the presence bit buffer area 15-4 and the control information buffer area 15-5 through the fourth and the fifth buffer output signal lines 15d and 15e, respectively. The second fault detection circuit 27 detects whether or not the buffer address translation is normally carried out by the address translation buffer 15 to produce a second fault detection signal when the buffer address translation is abnormally carried out. The second fault detection signal is supplied to an input terminal of a selector 28 which has another input terminal supplied with the first fault detection signal from the first fault detection circuit 26 (FIG. 2).

As shown in FIG. 3, the selector 28 is controlled by the output signal of the NAND gate 173. The selector 28 selects either the first fault detection signal or the second fault detection signal in accordance with the logic "1" and "0" levels of the output signal of the NAND gate 173 to supply a selected fault detection signal to a fault register 29. The selector 28 selects the first fault detection signal as a selected fault detection signal when the output signal of the NAND gate 173 takes the logic "1" level, namely, the address translation control circuit 16 is into the active state. Otherwise, the selector 28 selects the second fault detection signal as the selected fault detection signal. The selected fault detection signal is kept in the fault register 29 and is sent to the main memory 12 and to the execution processing unit as a control code signal.

When abnormality of the memory address translation is detected by the first fault detection circuit 26, the memory address translation operation is stopped. Moreover, the buffer storing operation is not usually carried out. However, the buffer storing operation is carried out if the abnormality of the memory address translation is only due to the second partial memory output signal representative of the specific memory presence bit MP which indicates an absence. Of course, the specific buffer presence bit BP to be stored in the presence bit buffer area 15-4 indicates an absence.

Accordingly, the address translation control circuit 16 stores, in combination with the first signal line 14a, and the first and the second data output lines 16a and 16b, the input virtual address, the particular memory real address MRA, and the specific memory presence bit MP in the address translation buffer 15 as the particular buffer virtual address BVA, the particular buffer real address BRA, and the specific buffer presence bit BP, respectively, no matter whether the specific memory presence bit MP indicates a presence or an absence. It is therefore possible to refer to a combination of the address translation control circuit 16, the first signal line 14a, and the first and the second data output lines 16a and 16b as a writing arrangement.

With this structure, it is possible to decrease a waste access to an address translation table when a prefetch operation is carried out on a conditional branch instruction. This is because an address translation buffer is loaded with presence bits indicative of either presence or absence of data of real addresses in a main memory that corresponds to virtual addresses issued from an execution processing unit no matter whether each of the presence bits indicates a presence or an absence. An absence of the specified real address corresponding to the particular virtual address can be found without accessing the address translation table in the main memory, provided that a previous address translation process has found the absence of the real address.

What is claimed is:

1. An address translation device used in combination with a main memory for translating an input virtual address into an output real address, said address translation device including an address translation buffer for storing a plurality of buffer virtual addresses and a plurality of buffer real addresses corresponding to respective buffer virtual addresses, and signal producing means coupled to said address translation buffer and responsive to an input signal indicative of said input virtual address for producing a buffer output signal representative of one of said buffer virtual addresses which corresponds to said input virtual address and one of said buffer real addresses that corresponds to said one of said buffer virtual addresses, said main memory comprising an address translation table loaded with memory presence bits each of which indicates presence or absence of data for a memory real address in said main memory in correspondence to an address translation table address, wherein:

said address translation buffer comprises a memory area for storing a selected part of said memory presence bits as buffer presence bits corresponding to respective buffer real addresses to indicate presence or absence of data for said memory real address in said main memory in correspondence to each of said buffer real addresses, said signal producing means generating said buffer output signal to indicate not only said one of said buffer virtual addresses and said one of said buffer real addresses but also one of said buffer presence bits which corresponds to said one of said buffer real addresses;

said address translation device further comprising:

comparing means responsive to said input signal and said buffer output signal for comparing said input virtual address with said one of said buffer virtual addresses, said address translation buffer providing to said main memory a device output signal indicative of said one of said buffer real addresses as said output real address when said input virtual address coincides with said one of said buffer virtual addresses and writing means coupled to said address translation table and said address translation buffer and responsive to said input signal for writing into said address translation buffer said input virtual address, a memory real address corresponding to said input virtual address, and one of said memory presence bits as said one of said buffer virtual addresses, said one of said buffer real addresses and said one of said buffer presence bits, respectively, regardless of whether said one of said memory presence bits indicates a presence or an absence, said one of said memory presence bits corresponding to said input virtual address.

2. An address translation device for translating an input virtual address into an output real address comprising:

a main memory including an address translation table, said address translation table including a plurality of memory presence bits each indicating either a presence or absence of data for a memory real address in said main memory corresponding to an address translation table address;

an address translation buffer, said address translation buffer storing a plurality of buffer virtual addresses and a plurality of buffer real addresses each corresponding to one of said plurality of buffer virtual addresses;

a memory area located in said address translation buffer which stores a selected part of said memory presence bits as buffer presence bits corresponding to respective buffer real addresses to indicate presence or absence of data for said memory real address in said main memory in correspondence to each of said buffer real addresses;

signal producing means coupled to said address translation buffer and responsive to an input signal indicative of said input virtual address for producing a buffer output signal indicating one of said buffer virtual addresses which corresponds to said input virtual address, one of said buffer real addresses that corresponds to said one of said buffer virtual addresses, and one of said buffer presence bits which corresponds to said one of said buffer real addresses;

a comparator, said comparator receiving said input signal indicative of said input virtual addresses and said buffer output signal and comparing said input virtual address with said one of said buffer virtual addresses, wherein said address translation buffer provides to said main memory a device output signal indicative of said one of said buffer real addresses as said output real address when said comparator indicates that said input virtual address coincides with said one of said buffer virtual addresses; and writing means, coupled to said address translation table and said address translation buffer and responsive to said input signal, for writing into said address translation buffer said input virtual address as said one of said buffer virtual addresses, a memory real address corresponding to said input virtual address as said one of said buffer real addresses, and one of said memory presence bits as said one of said buffer presence bits;

wherein said writing means writes into said address translation buffer regardless of whether said one of said memory presence bits corresponding to said input virtual address indicates a presence or an absence.

* * * * *